No. 880,455. PATENTED FEB. 25, 1908.
B. W. JONES.
STARCHING MACHINE.
APPLICATION FILED MAY 6, 1907.

3 SHEETS—SHEET 1.

Witnesses.
John W. Fisher.

Inventor.
Byron W. Jones
By Ward & Cameron
Attorneys.

No. 880,455. PATENTED FEB. 25, 1908.
B. W. JONES.
STARCHING MACHINE.
APPLICATION FILED MAY 6, 1907.
3 SHEETS—SHEET 2.
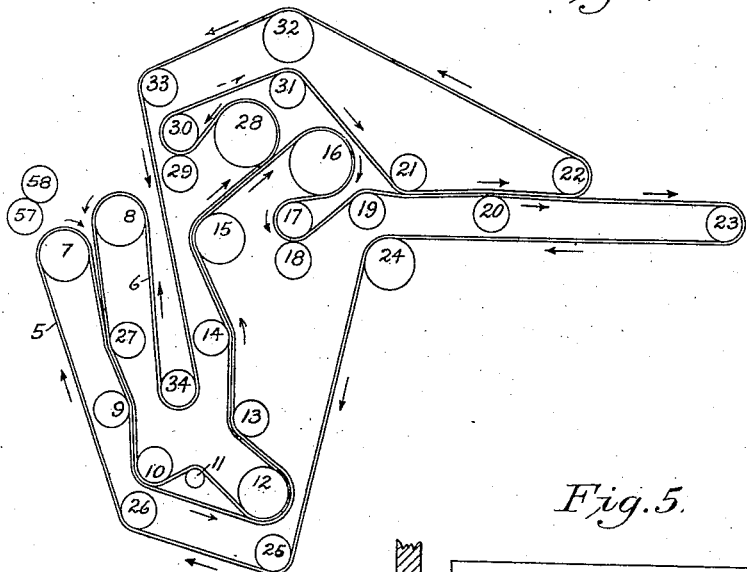
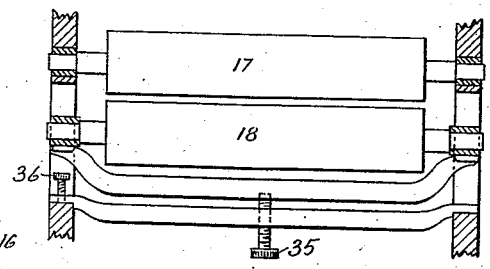
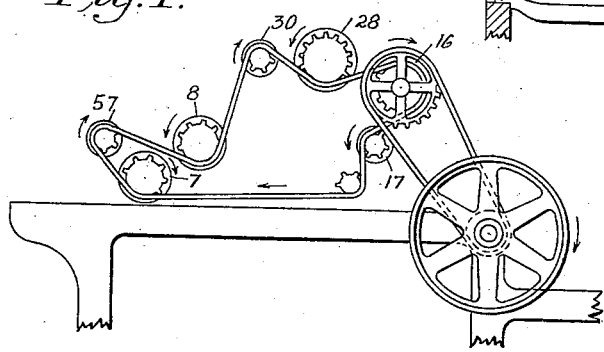
Witnesses.
John W. Fisher.
Inventor.
Byron W. Jones
By Ward & Cameron
Attorneys No. 880,455. PATENTED FEB. 25, 1908.
B. W. JONES.
STARCHING MACHINE.
APPLICATION FILED MAY 6, 1907.

3 SHEETS—SHEET 3.

Witnesses.
John W. Fisher

Inventor.
Byron W. Jones
By Ward & Cameron
Attorneys.

UNITED STATES PATENT OFFICE.

BYRON W. JONES, OF TROY, NEW YORK, ASSIGNOR OF THREE-FOURTHS TO GRACE MAY BEATTIE, OF COHOES, NEW YORK.

STARCHING-MACHINE.

No. 880,455.  Specification of Letters Patent.  Patented Feb. 25, 1908.

Application filed May 6, 1907. Serial No. 371,980.

*To all whom it may concern:*

Be it known that I, BYRON W. JONES, a citizen of the United States, residing at the city of Troy, in the county of Rensselaer and State of New York, have invented certain new and useful Improvements in Starching-Machines, of which the following is a specification.

My invention relates to machines for starching goods, especially collars and cuffs, in the process of laundering them, and the objects of my invention are to construct a machine which will carry the goods by two endless aprons over a series of rollers, through hot liquid starch and by the novel arrangement of the rollers expose the goods to the starch so they will become thoroughly saturated therewith and by other novel arrangements of the rollers to so cleanse the endless aprons from surplus starch adhering thereto that they will themselves absorb the surplus moisture and starch from the goods and deliver the goods in a proper condition. I also provide my starching machine with a novel automatic belt straightening device, by which the endless aprons will continue to travel in alinement over the series of rollers, without personal attention.

Figure 1:
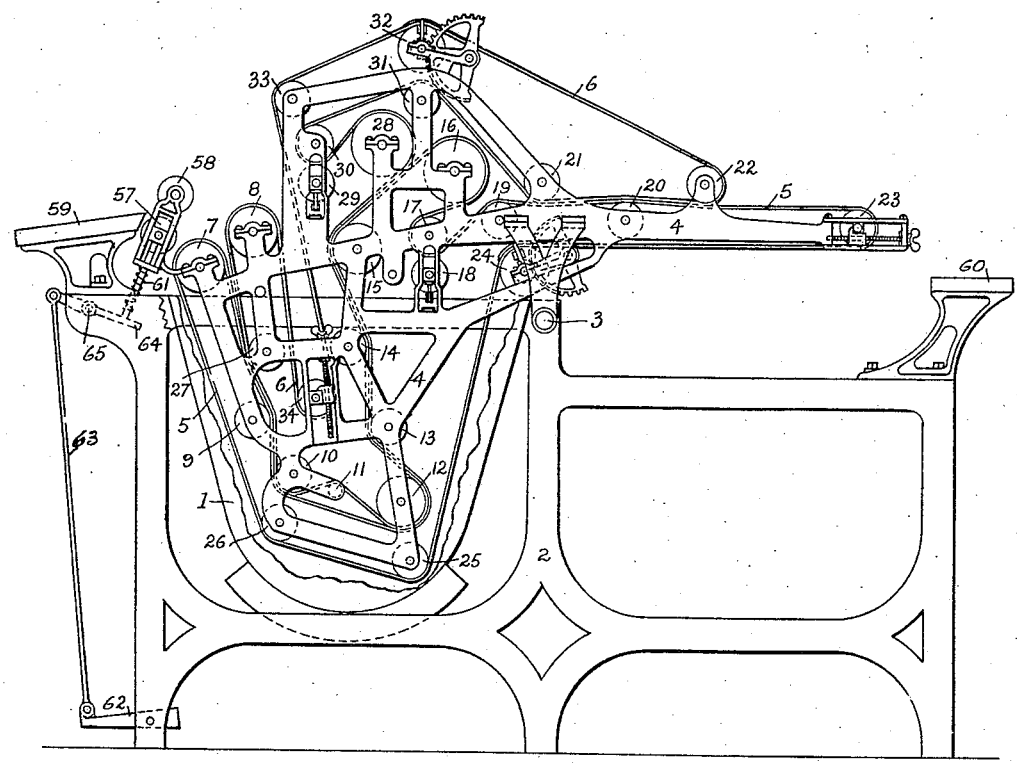
Figure 2:
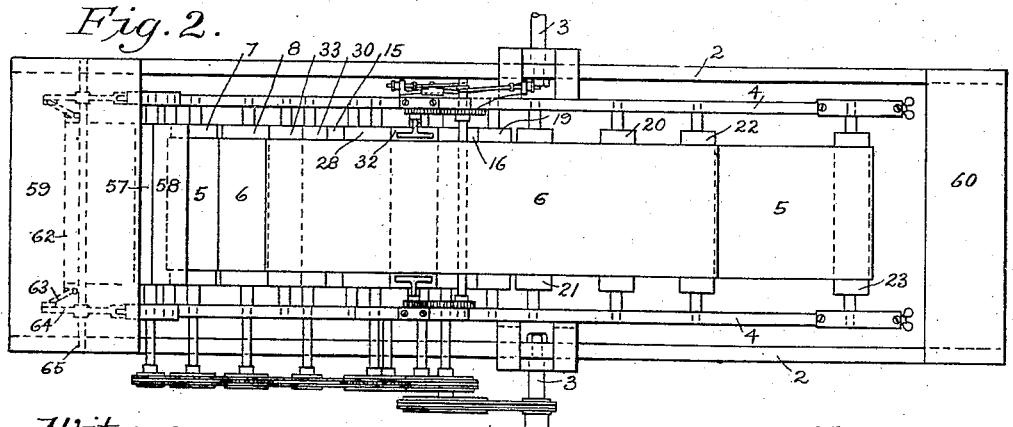
Figure 6:
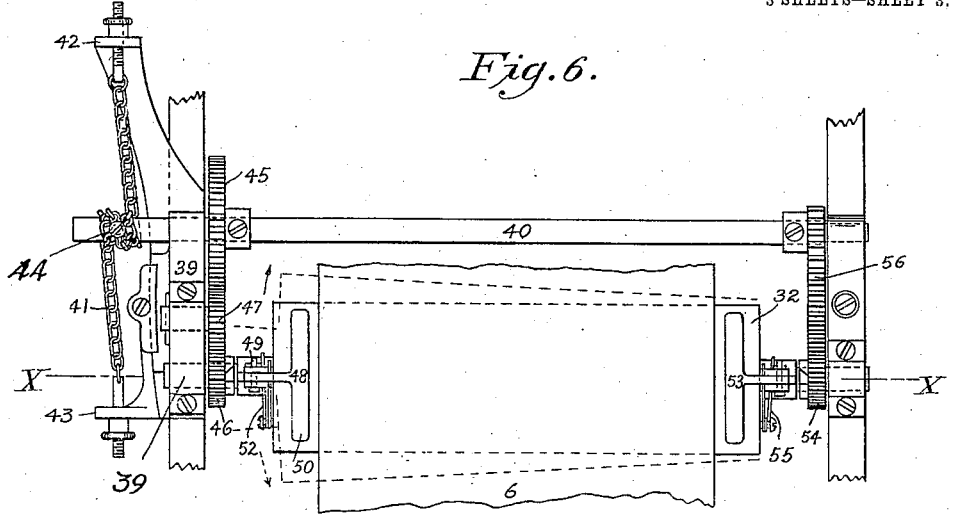
Figure 7:
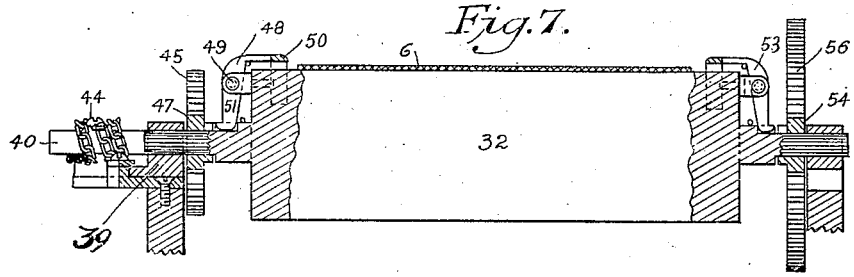
Figure 8:
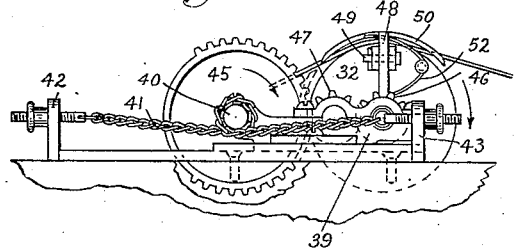
Figure 9:
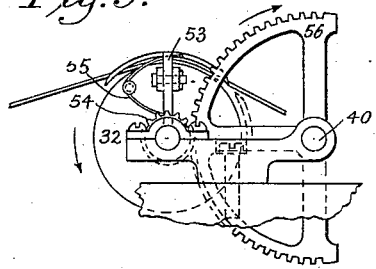
Figure 10:
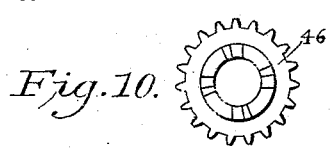

I attain the objects by means of the mechanism illustrated in the accompanying drawings, in which:

Figure 1 is a side view of my starching machine with the driving mechanism and side of the starch vat removed. Fig. 2 is a top plan view of my starcher. Fig. 3 is a diagram showing rollers and endless aprons and the direction of their movements. Fig. 4 is a side view showing the driving mechanism. Fig. 5 is a detail view of the cleansing or squeezing rollers. Fig. 6 is an enlarged detail plan view of the belt straightening device. Fig. 7 is a longitudinal section of the belt straightening device on line X—X Fig. 6. Fig. 8 is one end view of the belt straightening device, and Fig. 9 is the other end view of the belt straightening device. Fig. 10 is a detail view of the engaging pinion in the belt straightening device.

Similar figures refer to similar parts throughout the several views.

1 is a starch vat adapted to hold liquid starch of any desired form, and in which the starch is kept heated in any desired manner. This starch vat is mounted in the frame 2. Mounted in said frame 2, upon pivots, 3, 3, is another frame, 4, so arranged and constructed as to be more or less counterbalanced upon said pivots, 3, 3, and a part of said frame may be immersed in said starch vat or may be entirely raised out of said vat by turning it upon said pivots, 3, 3. A series of rollers are mounted in said frame, 4. Some of these rollers are designed to be immersed in liquid starch in said vat. Around these rollers are two endless aprons, 5 and 6. The goods to be starched are fed between these endless aprons as they come together in passing over the rollers 7 and 8.

Referring to Fig. 3 it will be seen that the endless apron 5 passes over roller 7 and continues downwardly over and in contact with roller 9 and under roller, 10, but not in contact with roller 11, also around rollers, 12, 13, 14, 15, and 16 and then passes between rollers 17 and 18, which will be more fully described hereafter, and then over rollers 19 and 20 and under rollers 21 and 22 and then continues free from the other endless apron over and around roller 23 and back over roller 24, and under rollers 25 and 26 to roller 7, the starting place. The endless apron 6 starts at roller 8 and moves toward endless apron 5, and at the same speed and in conjunction with it, along rollers 27, 9 and 10 and in contact with rollers 27 and 10. At roller 10 endless apron 6 leaves the endless apron 5 and passes over the roller, 11, leaving a clear open space between the two endless aprons at this point, the object of this will be hereafter more fully described. From roller 11 the endless apron, 6, again joins endless apron 5, at roller 12, passing under rollers 12 and 13 and in contact with rollers 12 and 14 and along roller 15 and over and around roller 28 and between the rollers 29 and 30 and around roller 30 and over roller 31 and under roller 21 and around roller 22, and over rollers 32 and 33, and around roller 34 back to roller 8 the starting point. Said rollers may be so located and adjusted that said endless aprons will be of the same size and interchangeable for convenience in starting and adjusting the machine. Roller 34 is adjustable and is provided with means for regulating the tension of endless apron 6, and roller 23 is also adjustable and provided with means for regulating the tension of endless apron 5. Endless apron 6 leaves contact with endless apron 5 at roller, 10, and passes over roller 11, leaving a clear open space between the two aprons at a point where the aprons are both submerged under the hot liquid starch for the purpose of allowing the liquid starch free access to thoroughly saturate the goods being treated in the machine without the protection of the two endless aprons. The goods will be carried by endless apron 5 from roller 10 to roller 12, will be freely exposed to the liquid starch and thus positively insure the starch reaching every part of the goods, which might otherwise escape. Rollers 17 and 18, and 29 and 30 are located above the liquid in the vat and are cleansing or squeezing rollers. Rollers 17 and 18 are for the purpose of cleansing the endless apron, 5, by squeezing the liquid starch therefrom as it passes between the two rollers. The rollers 29 and 30 cleanse the endless apron, 6, in the same way. Roller 16 is located above rollers 17 and 18 and is larger than those rollers, so that its periphery projects beyond them as shown in Fig. 3. Roller 19 is located higher than rollers 17 and 18, but lower than the center of roller 16, and near that roller as shown in said Fig. 3. The endless apron, 5, carrying the goods being starched, passes over rollers 16 and around the under side of it then over roller 17 and between it and roller 18 and then up near roller 16 and over roller 19. By this arrangement, the goods being starched do not remain upon the endless apron in its passage under roller 16 and between rollers 17 and 18, but as the endless apron goes below the center of roller 16 the goods drop from the apron to the surface of the apron at roller 19 after the apron has been cleansed by the rollers 17 and 18. The goods are then carried between the two endless aprons after they have been cleansed, and when the two endless aprons come together from roller 21 to roller 22 they will absorb the surplus moisture and starch remaining in the goods, so as to leave them in proper condition for further treatment after they are removed from endless apron 5, as it travels from roller 22 to roller 23. The degree of pressure to be exerted by the rollers 17 and 18 is regulated by the thumb screws, 33 and 36, as shown in Fig. 5, and the pressure on the rollers 29 and 30 is regulated in the same way.

I do not confine myself to the exact arrangement of the rollers herein described. The essential features being two endless aprons for carrying the goods through the liquid starch, the separation of those aprons, the cleaning rollers above the liquid to cleanse each of the aprons, separate from the other and without the goods being starched passing with the apron between the cleaning rollers the two aprons coming together on each side of the goods after being cleansed by the cleaning rollers, and the delivery of the goods by one of the two endless aprons at the rear end of the machine with the surplus moisture and starch sufficiently extracted, in combination with the automatic belt straightening device hereinafter described.

The proper motion is imparted to the rollers by any suitable system of gearing or belting, as shown in Fig. 4. When traversing so many rollers the endless belts are very apt to get out of alinement. To prevent this I provide automatic belt straightening devices one upon roller 32 to keep endless apron 6 straight and one on roller 24 to keep endless apron 5 straight. These devices are both alike and the description of the one used upon roller 32 applies also to the one used upon roller 24.

The belt straightening device is shown in Figs. 6 and 7, 8, 9 and 10, and comprise a movable block, 39, in which the journal at one end of the roller, 32, is mounted, 40 is a shaft parallel with the roller, 32, with a bearing on one end also mounted in said movable block 39. This block is arranged to slide horizontally a limited distance. 41 is a chain, or suitable strap, with one end attached to a portion of the frame, or any suitable support, as 42, at some distance from one end of the shaft 40, and the other end to a suitable portion of the frame or connection therewith, as 43, at some distance on the other side of the same end of the shaft, 40, as shown in Fig. 6, with suitable means for keeping each end of the chain, 41, at proper tension. Where the chain 41 is given two or three turns around the end of the shaft, 40, the center of the chain is fixedly attached to the end of the shaft 40, as by the screw 44. 45 is a cog wheel fixedly attached to the shaft 40. 46 is an idle pinion upon the shaft which carries the roller 32. 47 is an intermediate cog wheel connecting the gear wheel or pinion, 46, with the gear wheel 45, and with cogs meshing with the cogs on each of the gears 45 and 46. 48 is a lever attached at one end of the roller, 32, upon the pivot 49. One end of the lever, 50, extends over the end of the roller, 32, the other end of the lever is in the form of a dog, 51. The gear wheel or pinion, 46, has near its bearing openings suitable for the dog, 51, to engage in. 52 is a spring by which the lever, 48, is held away from the pinion 46, unless pressure is exerted upon the end, 50, of the lever, sufficient to overcome the resistance of the spring, and when the pressure is removed the spring will release the dog, 51, from the pinion, 46. At the other end of the roller, 32, is a lever, 53, which is similar in every respect and operates in the same way as lever 48. At this end of the roller, 32, is an idle pinion, 54, which is constructed substantially the same as the pinion, 46, with openings for the end of the lever, 53, to engage in. 55 is a spring similar to the spring 52 to hold the lever away from the pinion 54. 56 is a section of a gear wheel attached fixedly to the shaft, 40, with gears to mesh in the pinion, 54, and arranged so that when the roller, 32, is parallel with the other rollers the pinion, 54, will be in contact with the center of the gear wheel 56.

The operation of the belt straightening device is as follows: When the endless apron passing over the roller, 32, runs to one end of the roller it will run upon the end of the lever, 48 or 53, as the case may be, when it runs upon the end, 50, of the lever, 48, it will press that end downward upon the roller, so as to turn the lever upon the pivot, 49, and press the dog, 51, in one of the openings in the pinion, 46, and thus turn pinion, 46, with the roller, 32. This will turn the intermediate pinion, 47, which will turn the gear wheel, 45, and the shaft, 40; this will wind one end of the chain, 41, upon the end of the shaft, 40, and unwind the other end; this will draw the sliding block containing the bearings of the roller and shaft in the direction toward which the roller is turning. A slight movement upon the end of the roller will start the endless apron going toward the other end of the roller, and will soon release the lever, 48, and that will release the dog from the pinion, 46, and the end of the roller will cease this movement in that direction, then when the endless apron approaches the other end of the roller it will mount upon the end of the lever, 53, and in the same way start the pinion, 54, which will turn the shaft, 40, by the gear wheel, 56, in the other direction, and thus wind the other end of the chain 41 upon the end of the shaft, 40, and move the sliding block, 39, in the other direction until the endless apron has released the lever, 53. A slight movement to the end of the roller, 32, is sufficient to change the movement of the belt, and by this arrangement the belt is kept practically straight, in alinement, automatically during the whole operation.

57 and 58 are feed rollers.

59 is a feeding table from which to feed the goods to be starched between the feed rollers.

60 is a receiving table at the rear of the machine. The lower feed roller, 57, has bearings in the sliding boxes, so as to allow the feed roller, 57, to be separated from contact with the feed roller 58. The spring, 61, at each side of the machine around a depending rod secured to the box carrying an end of the lower feed roller draws the feed roller, 57, away from the feed roller, 58, when in its normal position.

62 is a foot pedal, to which is attached the connecting rods, 63, which are pivotally attached to the rocking arms 64. The arms, 64, are pivoted to the frame of the machine at 65, and bear at their inner ends against the rods depending from the bearing boxes of the roller, 57.

When the operator desires to feed the goods into the machine he steps upon the foot pedal, 62, thus pressing the roller, 57, against the roller, 58, and thus pressure may be made as firmly as desired, so that while the goods are being fed in between the rollers they may be stretched out smooth as may be desired. The goods passing between the feed rollers, 57 and 58, are carried between the rollers 7 and 8, and between the endless aprons, 5, and 6 and then down into and through the vat containing the liquid starch.

After passing under roller, 10, the goods will be carried by the endless apron, 5, below the roller, 11, and along until it reaches the roller 12. At roller, 12, the goods are taken between the two endless aprons and carried between them around roller, 12, and along by rollers, 13, 14 and 15, as shown in Fig. 3, until they reach roller, 28, at which point they separate. Apron, 6, passing over roller, 28, and roller, 5, carrying the goods passing over roller 16. The apron, 5, passes around under roller, 16, and between the cleaning rollers, 17 and 18, and up over roller, 19, which is slightly below the center of roller, 16, and near said roller. The goods being starched drop from the endless apron while it is passing under roller, 16, upon a portion of the apron at roller, 19, after it has been cleansed. The endless apron, 6, after it has passed between the cleaning rollers, 29 and 30, passes over roller, 31, and comes in contact again with the endless apron, 5, under roller, 21, and the two aprons there take the goods between them and absorb the surplus starch and moisture from the goods, and carry the goods along over roller, 20, and under roller, 22, until they reach the open space between rollers 22 and 23, where they will be removed in condition for further laundering. Constructed in this manner two endless aprons only are used to complete the entire operation. The goods will be exposed to a thorough saturation with the liquid starch while immersed in the vat, and after passing out of the liquid will be sufficiently cleaned from the surplus starch and moisture, by being taken between the two endless aprons after they have been cleansed by the cleaning rollers and will thus be delivered in the condition most desirable. At the same time the endless aprons are automatically kept straight upon the rollers without attention from the operator, and the machine will be cheap of construction and economical in operation.

What I claim as my invention and desire to secure by Letters Patent is:

1. A starching machine consisting of a vat adapted to hold liquid starch; a series of rollers, some of which are adapted to be located in the liquid contained in said vat, and others above the liquid; two endless aprons adapted to fit upon said rollers and to be operated thereby and adapted to carry the goods to be starched between them through the liquid in said vat, said aprons adapted to separate after emerging from the liquid in said vat, one of the said endless aprons adapted to pass between two cleaning rollers located outside of the liquid in said vat; the other endless apron adapted to pass between two other cleaning rollers located outside of the liquid in said vat; said endless aprons adapted to carry the goods out of said liquid without carrying the goods between either set of cleaning rollers, said endless aprons adapted to come together again on each side of the goods after each separate apron has passed between cleaning rollers; and two sets of cleaning rollers located outside of said vat adapted to cleanse the surplus starch from each of said endless aprons passing between them separately; substantially as described and for the purposes set forth.

2. In a starching machine, a vat adapted to hold liquid starch; a series of rollers some of which are adapted to be located in the liquid contained in said vat and some of which are located above said liquid; two endless aprons adapted to fit upon and be operated by said rollers and adapted to carry the goods to be starched between them through the liquid in said vat; said rollers which are located above the liquid being so arranged and adjusted that said endless aprons will separate after emerging from said liquid and each apron pass separately between different sets of cleaning rollers adapted to cleanse the surplus starch therefrom; one of said rollers so located in said vat that one endless apron will pass over and the endless apron carrying the goods will pass under it one of said endless aprons, carrying the goods being starched from the liquid being adapted to pass over and partly around a roller located above the cleaning rollers adapted to cleanse that apron and then between said cleaning rollers and then up again near said higher roller whereby the goods being starched will fall from a portion of said apron before it is cleansed while passing around said higher roller upon a portion of said apron after it has been cleansed, in combination with said cleaning rollers, adapted to cleanse each of said aprons separately, and means for adjusting the same substantially, as described and for the purpose set forth.

3. In a starching machine, a vat adapted to hold liquid starch; a series of rollers some of which are adapted to be located in the liquid contained in said vat and some of which are located above said liquid; two endless aprons adapted to fit upon and be operated by said rollers and adapted to carry the goods to be starched between them through the liquid in said vat; said rollers which are located above the liquid being so arranged and adjusted that said endless aprons will separate after emerging from said liquid and each apron pass separately between different sets of cleaning rollers adapted to cleanse the surplus starch therefrom; one of said endless aprons carrying the goods being starched from the liquid being adapted to pass over and partly around a roller located above the cleaning rollers adapted to cleanse that apron and then between said cleaning rollers and then up again near said higher roller whereby the goods being starched will fall from a portion of said apron before it is cleansed while passing around said higher roller upon a portion of said apron after it has been cleansed, in combination with said cleaning rollers, adapted to cleanse each of said aprons separately, and means for keeping said endless aprons true upon said rollers, substantially as described and for the purposes set forth.

In testimony whereof I have affixed my signature in presence of two witnesses.

BYRON W. JONES.

Witnesses:
WALTER E. WARD,
WALTER J. BEATTIE.